United States Patent
Roberts et al.

(10) Patent No.: US 10,968,953 B2
(45) Date of Patent: Apr. 6, 2021

(54) GREASABLE BEARING ASSEMBLY

(71) Applicant: Sandcraft, LLC, Glendale, AZ (US)

(72) Inventors: Jonathan D. Roberts, Glendale, AZ (US); Brent G. Reynolds, Phoenix, AZ (US)

(73) Assignee: Sandcraft, LLC, Glendale, AZ (US)

(*) Notice: Subject to any disclaimer, the term of this patent is extended or adjusted under 35 U.S.C. 154(b) by 0 days.

(21) Appl. No.: 16/676,294

(22) Filed: Nov. 6, 2019

(65) Prior Publication Data
US 2020/0072283 A1 Mar. 5, 2020

Related U.S. Application Data

(63) Continuation-in-part of application No. 15/866,219, filed on Jan. 9, 2018, now Pat. No. 10,471,825, which is a continuation-in-part of application No. 15/449,483, filed on Mar. 3, 2017, now Pat. No. 9,862,269, which is a continuation-in-part of
(Continued)

(51) Int. Cl.
*F16C 33/66* (2006.01)
*F16C 33/78* (2006.01)

(52) U.S. Cl.
CPC ...... *F16C 33/6622* (2013.01); *F16C 33/7886* (2013.01); *F16C 2208/32* (2013.01)

(58) Field of Classification Search
CPC .... F16C 33/66; F16C 33/603; F16C 33/6618; F16C 33/6622; F16C 33/784; F16C 33/7886; F16C 2208/32
See application file for complete search history.

(56) References Cited

U.S. PATENT DOCUMENTS

| 2,164,449 | A | * | 7/1939 | Delaval-Crow | .... F16C 33/6607 |
| | | | | | 384/466 |
| 2,449,574 | A | * | 9/1948 | Wilcock | .................... F16N 7/00 |
| | | | | | 384/469 |
| 2,620,244 | A | | 12/1952 | Beatty | |

(Continued)

FOREIGN PATENT DOCUMENTS

| DE | 2908709 A1 | | 9/1980 |
| EP | 2719909 | * | 4/2014 |
| WO | 2016080480 | | 5/2016 |

OTHER PUBLICATIONS

Polaris OEM part No. 3515075.
The product UCP206, including listings for sale (2018) and shown by catalog.

*Primary Examiner* — James Pilkington
(74) *Attorney, Agent, or Firm* — Booth Udall Fuller, PLC

(57) ABSTRACT

A greasable bearing assembly may include an outer ring, an inner ring disposed within, and concentric with, the outer ring, and a plurality of balls disposed between the outer ring and the inner ring. A greasable seal may be disposed adjacent the outer ring and the inner ring, the greasable seal further comprising a toroidal shape comprising an outer face and an inner face. An outer ring-shaped surface may extend from the outer face to the inner face. An inner ring-shaped surface may extends from the outer face to the inner face. An intake opening may be disposed through the greasable seal and extend from the outer ring-shaped surface to the inner face. A securing member may be formed as a lip at the inner face to mateably couple between the inner ring and the outer ring.

19 Claims, 9 Drawing Sheets

Related U.S. Application Data application No. 14/952,741, filed on Nov. 25, 2015, now Pat. No. 9,956,872.

(56) References Cited

U.S. PATENT DOCUMENTS

| | | | |
|---|---|---|---|
| 2,705,161 A | 3/1955 | Shafer | |
| 3,003,831 A | 10/1961 | King | |
| 3,295,801 A | 1/1967 | McDowall et al. | |
| 3,446,542 A | 5/1969 | Whitehurst | |
| 3,501,940 A | 3/1970 | Moore | |
| 3,981,550 A | 9/1976 | Zimmer et al. | |
| 4,421,187 A | 12/1983 | Shibata | |
| 4,541,738 A * | 9/1985 | Leibensperger | F16C 19/364 184/31 |
| 4,648,475 A | 3/1987 | Veglia | |
| 4,652,011 A | 3/1987 | Hollerweger | |
| 4,988,218 A * | 1/1991 | Quaglia | F16C 9/04 184/6.5 |
| 5,172,985 A | 12/1992 | Constancio | |
| 5,208,981 A | 5/1993 | Puzsik | |
| 5,211,484 A * | 5/1993 | Quaglia | F16C 9/04 384/322 |
| 5,975,573 A | 11/1999 | Belleau | |
| 7,374,019 B2 * | 5/2008 | Kosugi | B23Q 11/122 184/6.14 |
| 7,841,606 B2 | 11/2010 | Rey | |
| 7,901,142 B2 | 3/2011 | Mathis | |
| 8,132,640 B2 | 3/2012 | Heitkamp et al. | |
| 8,454,039 B2 | 6/2013 | Murakami | |
| 8,491,195 B2 * | 7/2013 | Kobayashi | B23Q 11/123 384/474 |
| 8,544,591 B2 | 10/2013 | Felchner | |
| 9,193,377 B2 | 11/2015 | Pavuk | |
| 9,254,743 B2 | 2/2016 | Yoo | |
| 9,366,294 B2 | 6/2016 | Kim | |
| 9,382,968 B2 | 7/2016 | Paulson | |
| 2003/0236122 A1 | 12/2003 | Blumke | |
| 2004/0011584 A1 | 1/2004 | Henkel | |
| 2009/0211386 A1 | 8/2009 | Hayes | |
| 2009/0214149 A1 | 8/2009 | Hoppert | |
| 2010/0065364 A1 | 3/2010 | Felchner et al. | |
| 2010/0289238 A1 | 11/2010 | Archer | |
| 2012/0248724 A1 | 10/2012 | Watanabe | |
| 2015/0093062 A1 | 4/2015 | Kim | |
| 2017/0174077 A1 | 6/2017 | Roberts | |

\* cited by examiner

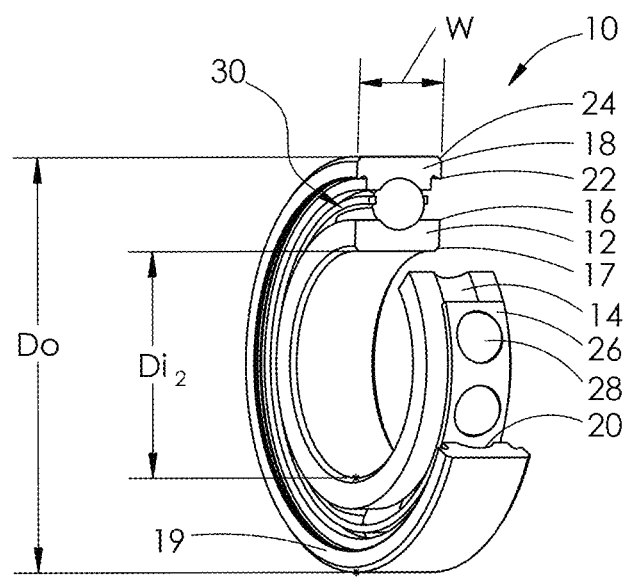
FIG. 1A --Prior Art--
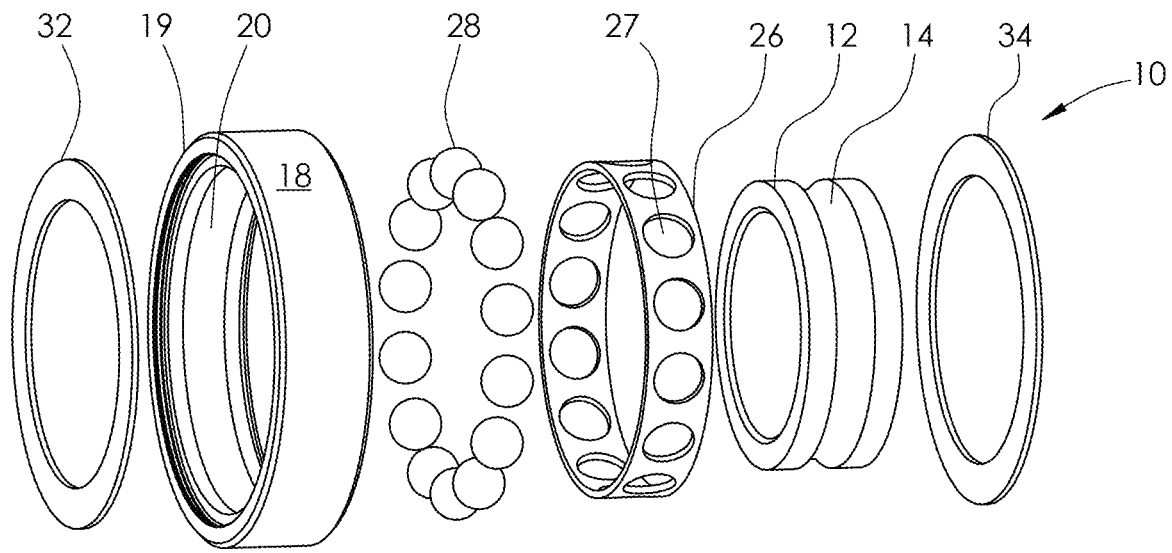
FIG. 1B --Prior Art--

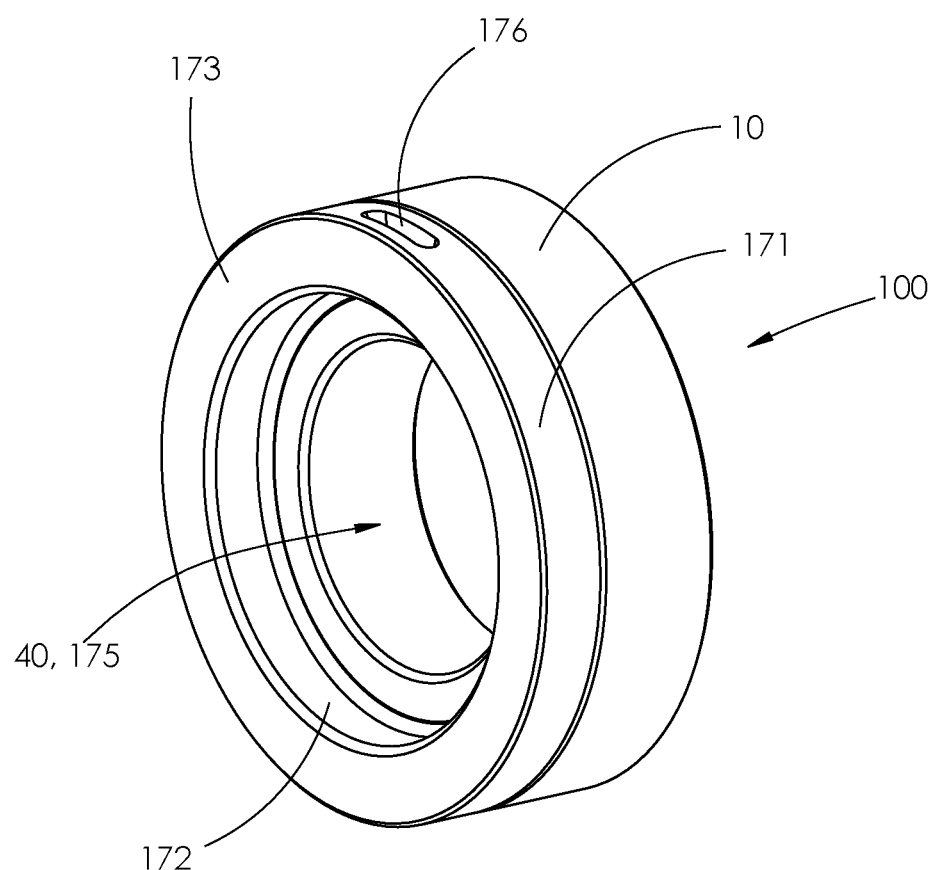
FIG. 2A
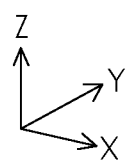

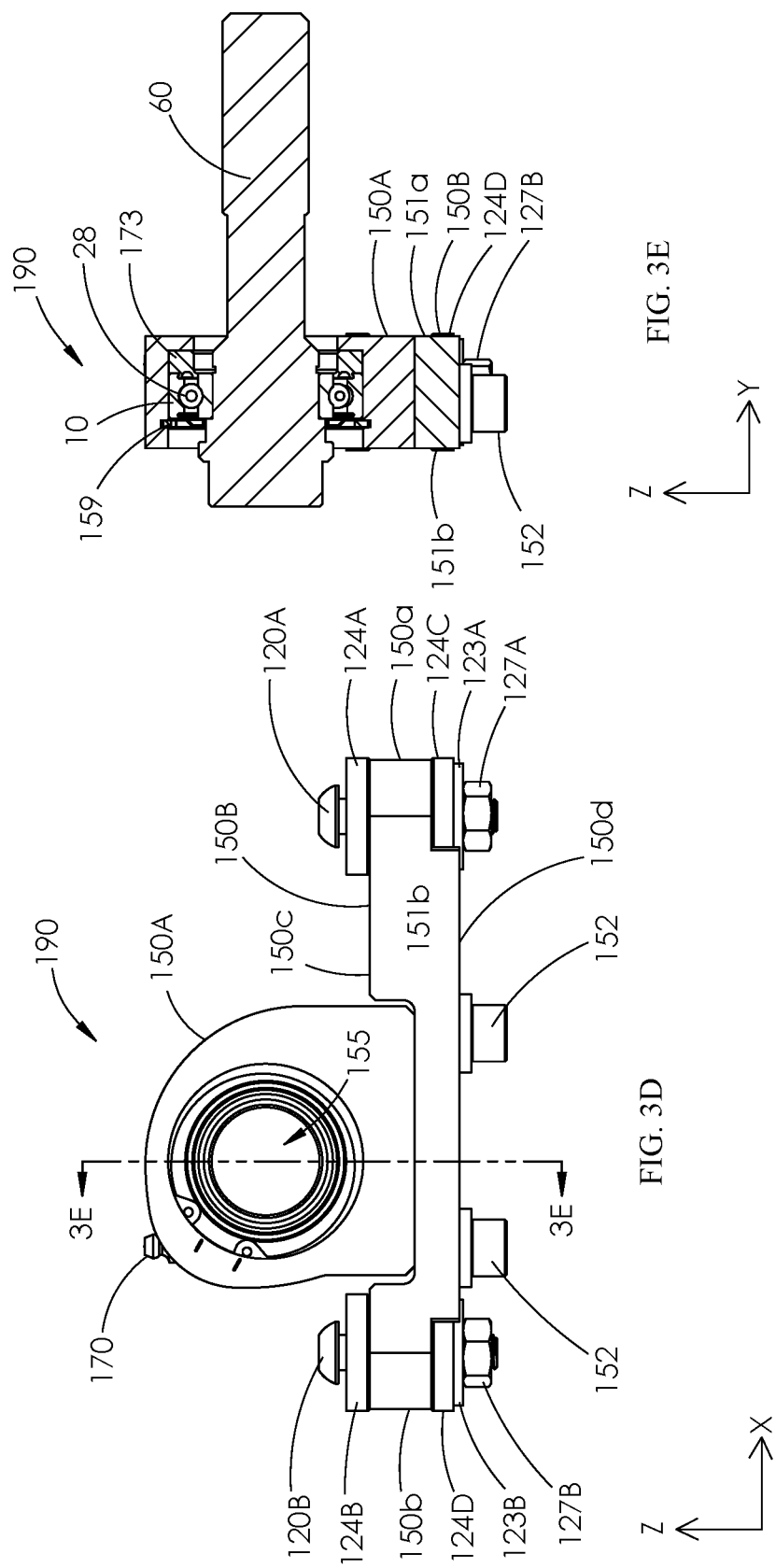

GREASABLE BEARING ASSEMBLY

RELATED APPLICATIONS

This application claims priority to, and is a continuation-in-part of, U.S. patent application Ser. No. 15/866,219, filed Jan. 9, 2018, now pending, which claims priority to, and is a continuation-in-part of, U.S. patent application Ser. No. 15/449,483, filed Mar. 3, 2017, issued as U.S. Pat. No. 9,862,269, which application claims priority to, and is a continuation-in-part of, U.S. patent application Ser. No. 14/952,741, filed Nov. 25, 2015, issued as U.S. Pat. No. 9,956,872, the entirety of the disclosures of which are hereby incorporated herein by this reference.

TECHNICAL FIELD

The present disclosure relates to bearings generally, and to ball bearings such as those used for carrier bearing assemblies.

BACKGROUND

A ball bearing is a type of rolling-element bearing that uses balls disposed between concentric rings or bearing races to maintain the separation between the races. The balls or rolling-elements provide for relative movement between the concentric races to support radial and axial loads while reducing rotational friction between the races by the rolling or rotation of the balls, which provides for a lower coefficient of friction than if the two races were to rotate by sliding against each other.

FIG. 1A shows a cut-away perspective view of a bearing, ball bearing, roller bearing, or greasable bearing 10. The ball bearing 10 comprises an inner ring or inner race 12 that comprises an inner surface and an outer surface opposite the inner surface. While the bearing 10 will sometimes be referred to as a ball bearing for convenience, and not by way of limitation, a person of ordinary skill will appreciate that the ball bearing can be a roller bearing or other similar or suitable bearing. The inner ring 12 may be made of metal, including steel, aluminum, titanium, brass, as well as ceramic, or other suitable strong and durable material. The inner surface of the inner ring 12 defines an inner diameter or bore Di that can receive a shaft or rotational element, or a piece about which rotation is desired. The outer surface of the inner ring 12 further comprises an inner groove, track, or ring ball race 14. The inner groove 14 is bordered by inner shoulders 16. The inner surface of the inner ring 12 comprises bore corners 12, which can be rounded and connect the inner diameter Di to a face 19 of the ball bearing 10. The inner ring 12 is nested within, concentric with, and shares a center with an outer ring or outer race 18.

The outer ring or outer race 18 comprises an inner surface and an outer surface opposite the inner surface. The outer ring 18 may be made of metal, including steel, aluminum, titanium, brass, or other suitable strong and durable material. The outer surface of the outer ring 18 comprises outer diameter corners 24. The outer surface of the outer ring 18 further defines an outer diameter Do that determines the areas into which the ball bearing 10 may be disposed. The inner surface of the outer ring 18 may comprise an outer groove, track, or ring ball race 20. The outer groove 20 may be bordered by outer shoulders 22. The outer groove 20 aligns with the inner groove 14 for receiving balls 28.

The balls, spheres, or rollers 28 may be seated within both the inner groove 14 and the outer groove 20 when the inner ring 12 is nested within the outer ring 18. While the balls may be spherical in shape or form, they need not be, and referred to as balls for convenience, and not by way of limitation. Balls or rollers 28, may in some instance, be cylindrical or rounded in a first direction and not rounded, curved, or designed to roll in a second or additional direction. In any event, the balls 28 may be made of metal, including steel, aluminum, titanium, brass, or other suitable strong and durable material, that may be the same material or a different material than the inner ring 12, the outer ring 18, or both. The balls 28 may be held in place with a desired space or separation between and among the balls 28 by the cage, retainer, or separator 26.

The cage 26 may be disposed or nested between, and concentric with, the inner ring 12 and the outer ring 18. As such, the cage 26 may be smaller than the outer ring 18 and larger than the inner ring 12. The cage 26 may be made of metal, including steel, aluminum, titanium, brass, or other suitable strong and durable material, including plastic, ceramic, fiber, such as fiber glass or carbon fiber, or other suitable material, which may be the same or different than the material(s) of the inner ring 12, the outer ring 18, and the balls 28. The cage 26 may comprise any desirable number of openings 27 (as shown, e.g., in FIG. 1B) within the cage 26 sized, adapted, or configured to receive the balls 28. The cage 26 may provide a desired spacing and maintain a desired position of the balls 28 within the inner groove 14 and the outer groove 20. The openings may also allow for the balls 28 to rotate, spin, and move relative to the cage 26 within the inner groove 14 and the outer groove 20, to facilitate the movement and rotation of the inner ring 12 and the outer ring 18 without sliding, with reduced friction, or both.

FIG. 1B shows an exploded view of a ball bearing 10 similar to what was shown in FIG. 1A. FIG. 1B shows another variation of the cage 26 for holding balls 28. FIG. 1B also shows ball bearing 10 can be a sealed bearing in which a first shield 32 is disposed at, near, or adjacent the face 19 of the bearing to cover and protect the cage 26 and the balls 28 from foreign debris. A second shield 34 is disposed at, near, or adjacent a face of the ball bearing 10 opposite the face 19 of the bearing to cover and protect the cage 26 and the balls 28 from foreign debris. Foreign debris entering the ball bearing 10 can damage or impede the relative movement of the inner ring 12, the outer ring 18, and the rolling of the balls 28.

Additionally, a lubricant, such as grease or oil, may be disposed within the bearing 10 to reduce friction and promote movement by being in contact with the inner ring 12, the outer ring 18, and the balls 28, as well as between and among the spaces formed therebetween. Not all bearings are sealed, e.g., inside an engine where the bearing is immersed in oil, where the oil acts as the lubricant, and the bearing need not be separately sealed as the engine or other environment is sealed to prevent debris from damaging the bearing.

When a bearing is not in oil and is subject to foreign debris, sealed bearings are often used to prevent foreign debris from getting into the bearing. After a time, the lubricant or grease within the bearing 10 may begin to lose effectiveness and need to be replaced. Ball bearings have conventionally been disassembled, or have shields 32 and 34 removed, to have the bearing 10 repacked with grease to ensure proper lubrication to support desired performance and extend the life of the parts and bearings being used. Repacking a bearing with new grease may involve removing one or more of the shields 32, 34, such as by using a pick or razor knife. The old grease can be removed and new grease added. The one or more shields 32, 34 can then be replaced. In other instances, new grease can be added without removing the covers or shields 32, 34, such as by using an injector needle.

SUMMARY

A need exists for a greasable bearing assembly. Accordingly, in an aspect, a greasable bearing assembly can comprise an outer ring, an inner ring disposed within, and concentric with, the outer ring, a separator comprising a plurality of openings disposed between the outer ring and the inner ring, and a plurality of balls disposed within the plurality of openings. A seal may be disposed at a first side of the outer ring and the inner ring and coupled between the outer ring and the inner ring to cover the separator and the plurality of balls. A greasable seal may be disposed opposite the seal at the first side, the greasable seal further comprising a toroidal shape comprising an outer face and an inner face. An outer ring-shaped surface may extend from the outer face to the inner face. An inner ring-shaped surface may extend from the outer face to the inner face. An intake opening may be disposed through the greasable seal, extending from the outer ring-shaped surface to the inner face. A securing member may be formed as a lip at the inner face to mateably couple between the inner ring and the outer ring.

The greasable bearing assembly can further comprise the greasable seal being formed of a metal, such as brass, or of a polymer or plastic, such as Polytetrafluoroethylene (PTFE), or of any suitable material. The intake opening of the greasable seal may be in communication with a zerk, whether male or female, and the bearing may intake grease with needle injections or any other way to receive a transfer of lubricants. The greasable seal may comprise a thickness (Ts) that is measured in a direction perpendicular to a radial direction (r) of the greasable seal, the thickness Ts being in a range of 0.5-1.1 times a thickness Tr of the outer ring. An egress opening may be formed in the greasable seal opposite the intake opening to allow excess grease to exit the greasable seal. The egress opening may be smaller than the intake opening. The lip at the inner face of the greasable seal may be press-fit between the inner ring and the outer ring.

In another aspect, a greasable seal for a greasable ball bearing assembly may comprise a toroidal shape comprising an outer face and an inner face. An outer ring-shaped surface may extend from the outer face to the inner face. An inner ring-shaped surface may extend from the outer face to the inner face. An intake opening may be disposed through the greasable seal and extend from the outer ring-shaped surface to the inner face. A securing member may be formed as a lip at the inner face to mateably couple between an inner ring and an outer ring of a ball bearing.

The greasable seal may be formed of PTFE. The greasable seal can further comprise the intake opening of the greasable seal being in communication with a zerk. The greasable seal may comprises a thickness Ts that is measured in a direction perpendicular to a radial direction r of the greasable seal, the thickness Ts being in a range of 0.5-1.1 times a thickness Tr of an outer ring or a bearing to which the greasable seal is configured to be coupled. An egress opening may be formed in the greaseable seal opposite the intake opening to allow excess grease to exit the greasable seal. The egress opening may be smaller than the intake opening. The lip at the inner face of the greasable seal may be configured to be press-fit between an inner ring and an outer ring of a bearing.

In another aspect, a greasable bearing assembly can comprise a toroidal shape comprising an outer face and an inner face. An outer ring-shaped surface can extend from the outer face to the inner face. An inner ring-shaped surface can extend from the outer face to the inner face. An intake opening can be disposed through the greasable seal that extends to the inner face. A securing member may be formed on the inner face to mateably couple with a ball bearing.

The carrier bearing can further comprise the intake opening disposed through the greaseable seal and extend from the outer ring-shaped surface to the inner face. The securing member may further comprise a lip formed on the inner face to mateably couple between an inner ring and an outer ring of a ball bearing. The greasable seal may be formed of PTFE. The intake opening of the greasable seal may be in communication with a zerk, whether male or female, and the bearing may intake grease with needle injections or any other way to receive a transfer of lubricants. An egress opening may be formed in the greasable seal opposite the intake opening to allow excess grease to exit the greasable seal.

BRIEF DESCRIPTION OF THE DRAWINGS

FIGS. 1A and 1B illustrate various views of conventional ball bearings as known in the art.

FIGS. 2A-2I illustrate a greasable bearing and bearing shield away from a carrier bearing assembly.

FIGS. 3A-3E illustrate various views of another embodiment of a carrier bearing assembly.

DETAILED DESCRIPTION OF THE INVENTION

Figure 2B:
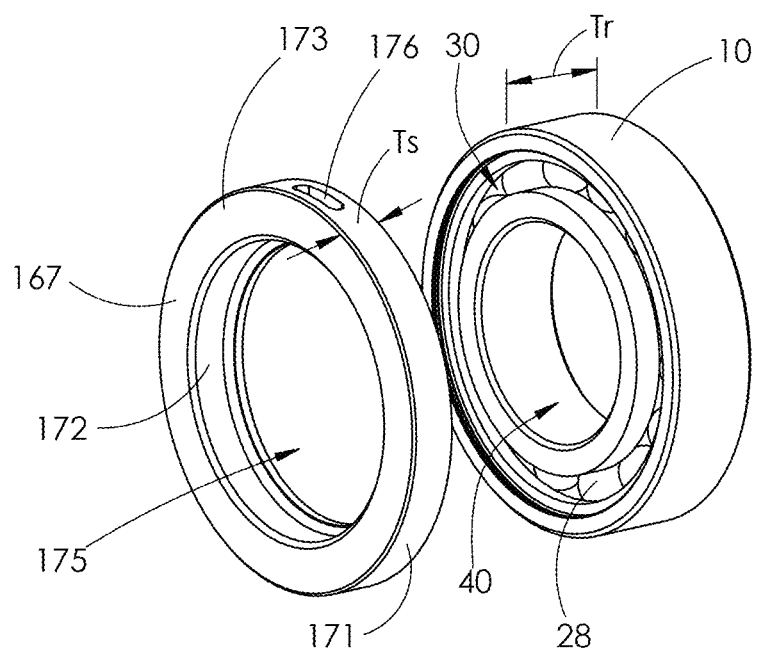

This disclosure, its aspects and implementations, are not limited to the specific material types, or other system component examples, or methods disclosed herein. Many additional components, manufacturing and assembly procedures known in the art consistent with its manufacture are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in different forms, there is shown in the drawings and will herein be described in detail, particular embodiments. As such, the disclosure is presented with the understanding that the disclosure is to be considered as an exemplification of the principles of the disclosed structures, methods, and systems, and is not intended to limit the broad aspect of the disclosed concepts to the embodiments illustrated.

FIGS. 2A-2G illustrate a greasable bearing assembly 100 comprising bearing 10 and a greasable seal, greasable bearing seal, bearing shield, or greasable bearing shield 173 coupled to the bearing 10. The term "greasable seal 173", uses the word grease for convenience and not by way of limitation, and as such, a person of ordinary skill in the art will appreciate that any other suitable form of lubricant besides grease may also be used with greasable seal 173. Furthermore, in some instances a grease will be the suitable lubricant, and may even be the only lubricant used or desired.

FIG. 2A shows a perspective view of the greasable bearing 10 and bearing shield 173 disposed away from a carrier bearing assembly 190, which is shown in FIGS. 3A-3E. In some instances, the greasable seal 173 may be coupled, snapped, or threaded onto the bearing 10, while the conventional bearing shield 174 may be disposed adjacent the bearing 10 without being coupled, snapped, or threaded onto the bearing 10. When a custom bearing shield 173 is used, the custom bearing shield can comprise an opening or hole 40 in bearing 10, and an opening or hole 175 in greasable seal 173, as shown, extending through the respective pieces, to allow for a shaft 60 to pass or extend therethrough. The custom bearing shield 173 is shown comprising an intake, channel, shaft, or opening 176 extending from a first or outer end 176a of the intake 176 at an outer surface or ring-shaped surface 171 of the bearing shield 173, through the custom bearing shield 173, to an inner or second end 176b of the intake 176 disposed at an inner surface or ring-shaped surface 172 of the bearing shield 173, to provide access or ingress for a lubricant, such as grease that can be injected at the zerk 170, enter through intake 176, and surround balls 28 within the bearing 10. The zerk 170 may be male or female, and the bearing may intake grease through the zerk 170, without a zerk 170, with needle injections, or in any other way to receive a transfer of lubricants. The greasable seal 173 can be made of, or include, any suitable material, such as materials similar or identical to bearing shield 174, including metal, plastic, ceramic, fiber, or other suitable material, such as a fluoropolymer or a fluorocarbon-based polymer, such as polytetrafluoroethylene.

Figure 3A:
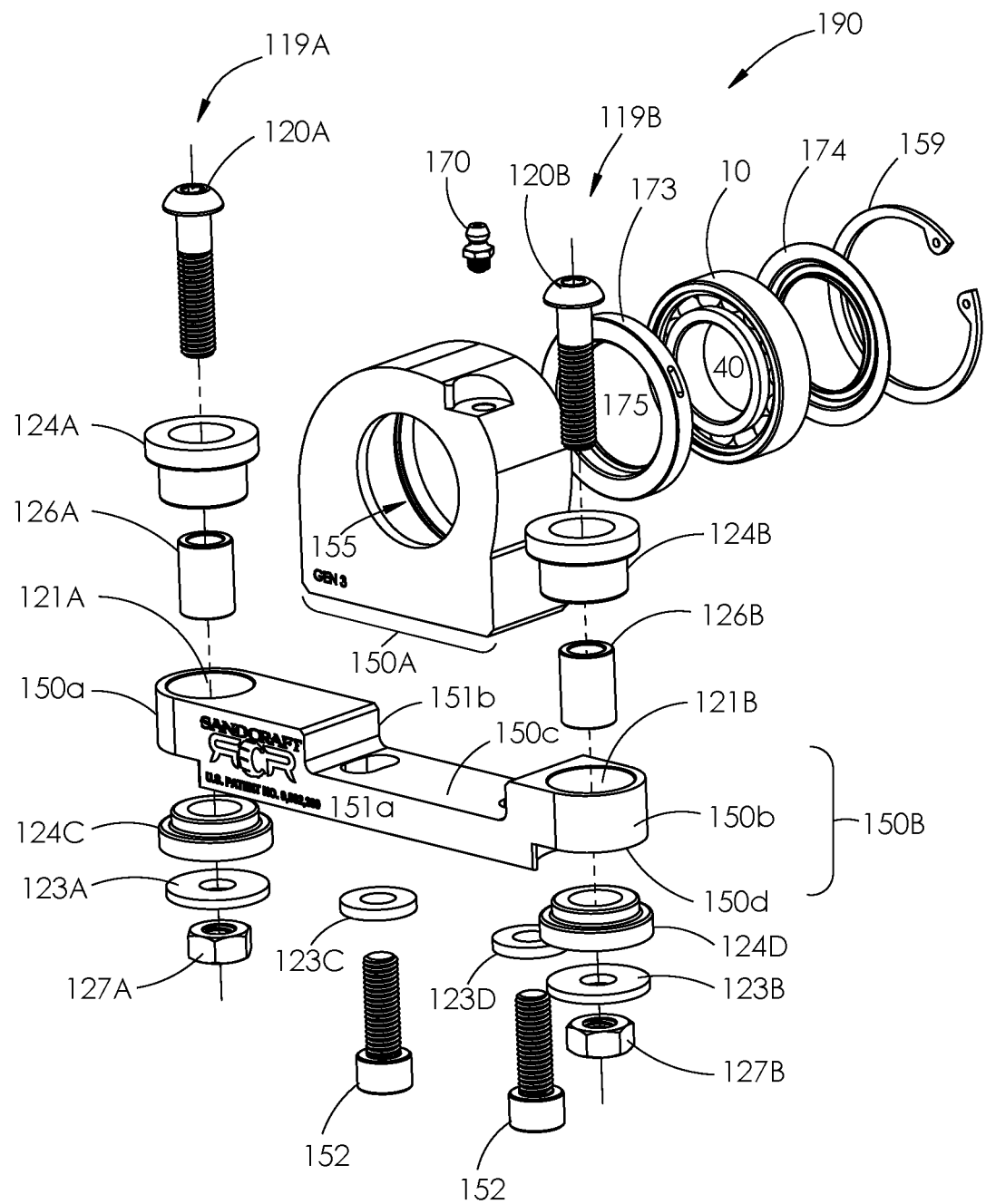

FIG. 2B shows a perspective view of the greasable bearing 10 and bearing shield 173 similar to view shown in FIG. 2A, but as an exploded view with the bearing 10 separated from the greasable seal 173, with the balls 28 within the bearing 10 being exposed. The exposed balls 28 show an area that can receive grease or other lubricant from intake 176, that allows the bearing to receive additional lubrications without removing the bearing from an installed position, such as from within a carrier bearing assembly 190, as shown in FIGS. 3A-3E, or from on a shaft, as shown in FIG. 3E.

The greasable seal 173 may be capable of receiving, and may be adapted or configured to receive, grease through intake 176 such that the greaseable seal 173 fills with grease and also provides a pathway, conduit, or passage for the grease to pass from the greasable seal 173 to the bearing 10 such that the grease is disposed between the inner ring 12 and the outer ring 18, and surrounds or contacts the balls 28, or rollers, and the cage 26. The greasable seal 173 may also be toroidal in shape to match the curved or ring-shaped hoops of the bearing 10 and the opening 27. In some instances, the greasable seal 173 can be snapped, press-fit, threaded, or otherwise desirable coupled onto the bearing 10.

Figure 2C:
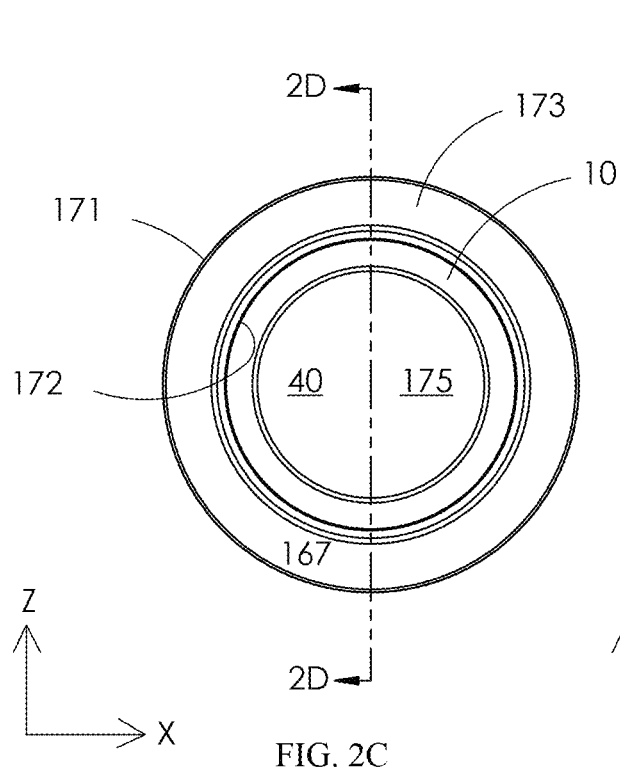

FIG. 2C shows a profile view, in the z-x plane, of the greasable bearing 10 and bearing shield 173 coupled together, similar to what was shown in the perspective view of FIG. 2A. In FIG. 2C, the outer face 167 of the bearing shield 173 is shown oriented towards the viewer, with a portion of the bearing 10 visible within the opening 40 of the bearing 10. The section line 2D-2D shows the section line along which the view of FIG. 2D is taken.

Figure 2D:
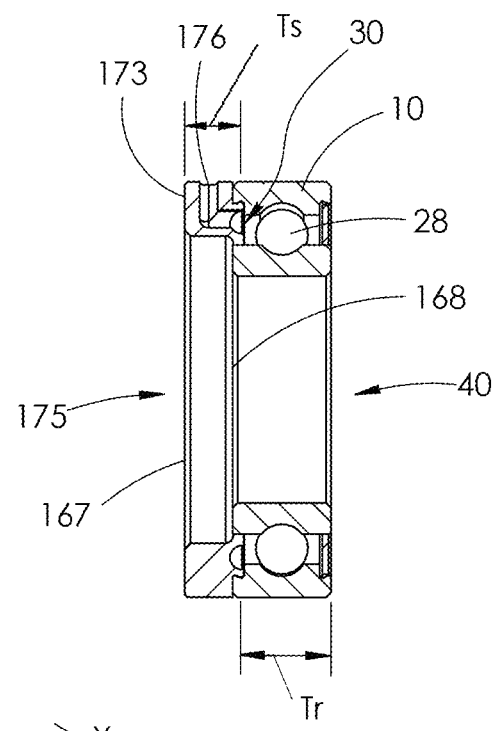

FIG. 2D shows a cross-sectional profile view, in the z-y plane, of the greasable bearing 10 and bearing shield 173 coupled together, as taken along section line 2D-2D shown in FIG. 2C. FIG. 2G, similar to FIG. 2D, also shows a cross-sectional profile view of the greasable bearing shield or greasable seal 173, but without being coupled to the bearing 10. The greasable seal 173 may comprise a thickness (Ts) that is measured in a direction perpendicular to a radial direction (r) of the greasable seal 173, the thickness Ts being in a range of 0.5-1.1 times a thickness Tr of the outer ring 18, or in a range of 5 mm-15 mm.

In either event, FIGS. 2D and 2G show the intake 176 extending from an outer surface 171 of the bearing shield 173 to the inner face 168 of greasable seal 173, adjacent the balls 28 within the bearing 10, or both. The egress, inner, or second end 176b of the intake opening 176 may be formed at the inner face 168 of greasable seal 173. The ingress, outer, or first end 176a of the intake 176 may be positioned at, and extend from, the outer surface 171 of the bearing shield 173 to the ball bearings 28 within the bearing 10. In other instances, the ingress 176a of the intake 176 may extend to, be positioned at, or be formed in or through, the outer face 167 of the greasable seal 173. When the ingress 176a is formed in the outer face 167 the ingress may be opposite the egress, inner, or second end 176b of the intake opening 176. The egress 176b of the intake opening 176 may be formed at the inner face 168 of greasable seal 173.

The attachment between the greasable bearing 10 and bearing shield 173 may be a press-fit or friction fit attachment that is sufficiently tight and strong to prevent grease or lubricant being applied to the bearing 10, including around balls 28, to exit at an interface between the bearing 10 and the bearing shield 173. With a press-fit or friction fit attachment between the bearing 10 and bearing shield 173, the bearing shield 173 may be rotated, once attached, to ensure the ingress 176a is at a desired position, and aligns with desired features, such as a grease zerk 170.

Figure 2E:
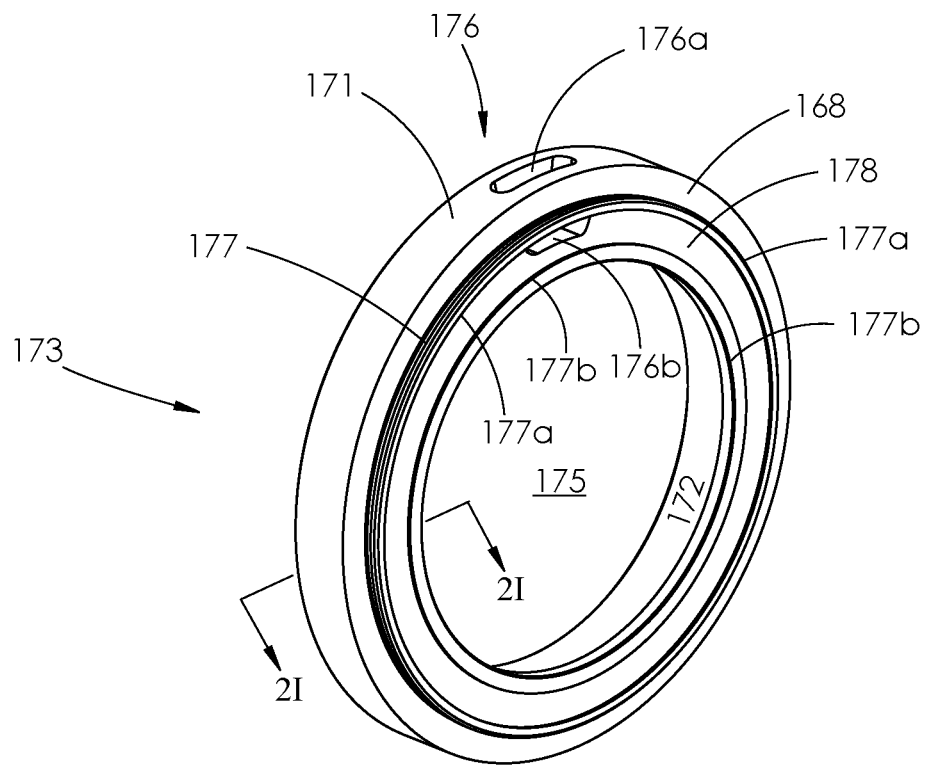

FIG. 2E shows a perspective view of the bearing shield 173 detached, or away, from the bearing 10, and opposite the view shown in FIGS. 2A and 2B. FIG. 2E shows the inner face 168 of the bearing shield 173 exposed and oriented towards the reader, rather than the outer face 167 of the bearing shield 173 being exposed and oriented towards the reader as shown in FIGS. 2A and 2B. The view of FIG. 2E also shows a securing member, snap, threading, or lip 177 formed as part of the bearing shield 173 for coupling the bearing shield 173 to the bearing 10. In some instances, the lip or lips 177 may be formed comprising a first, outer, or upper lip 177a that is disposed a first distance from a radial center C of the bearing shield 173. The lip or lips 177 may also comprise a second, inner, or lower lip 177b that is disposed a second distance, less than the first distance, from the radial center C of the bearing shield 173. The lips 177 may be a part of the inner face 168 and be positioned farther from the outer face 167 than the rest of the inner face 168, so as to protrude away from the main body of the greasable seal 173 and to slide, fit, or be disposed within a receiving portion 30 of the bearing 10. The receiving portion 30 of the bearing 10 may comprise a portion below the outer ring 18 (e.g., nearer the center of the bearing opening 40 that the outer ring 18) and above the inner ring 12 (e.g., farther the center of the bearing opening 40 than the inner ring 12). The receiving portion 30 of bearing 10 may be for receiving conventional shields, such as first shield or seal 32 and second shield or seal 34, as well as receive the greaseable seal 173, such as when the greasable seal 173 is made to fit with bearing 10.

A lubricant or grease channel 178 may be disposed between, bordered by, and formed with respect to the lips 177. As such, the lubricant or grease can enter the greasable seal 173 through the ingress 176a and exit the egress 176b after passing through the intake 176. Exiting the egress 176b, the lubricant or grease may travel in, along, and through the channel 178 and adjacent, around, and in contact with the inner groove 14 and inner surface of the inner ring 12, the outer groove 20 and the inner surface of the outer ring 18, the cage 26, and the balls 28 of the bearing 10.

In some instances, a second slot, outflow, lubricant outflow, channel, shaft, or opening 179, shown for example in FIG. 2G, may be formed in the bearing shield 173 similar to the intake 176. The outflow 179 may be positioned opposite the intake 176 so that the lubricant will travel an entire course of the channel 178 before arriving at the outflow 179. As size of the channel 178 and the outflow 179 may be sized such that the lubricant, when following the path of least resistance, will contact, coat, or both contact and coat at least a portion and perhaps all or substantially all of the inner groove 14 and inner surface of the inner ring 12, the outer groove 20 and the inner surface of the outer ring 18, the cage 26, and the balls 28 of the bearing 10, before excess lubricant or grease begins to exit the outflow 179. In such instances, when the lubricant or grease begins to exit the outflow 179, the lubricant exiting the outflow will indicate the bearing is full of lubricant, and no additional lubricant need be added at the intake at the time. In some instances the outflow may be covered or plugged to fill any voids or areas without lubricant within the bearing 10 and seal 173. In other instances, the bearing shield 173 may be made with only one intake 176 and without any outflow 179, such that excess lubricant, such as grease, will exit back out through the intake 176. The connection or attachment of the greasable seal 173 to the bearing 173, such as by a press fitting or other suitable fitting such as with threads, twisting, or screwing, may be done with sufficient force so as to prevent detachment of the bearing shield 173 and the bearing 10 with respect to each other when excess lubricant or grease enters and exits the bearing shield 173 and the bearing 10.

Figure 2F:
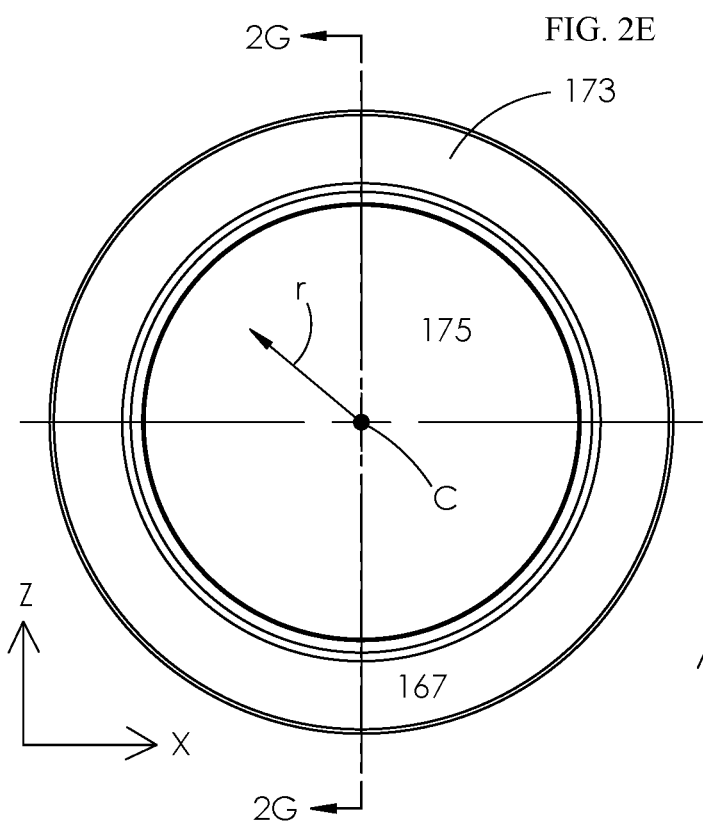
Figure 2G:
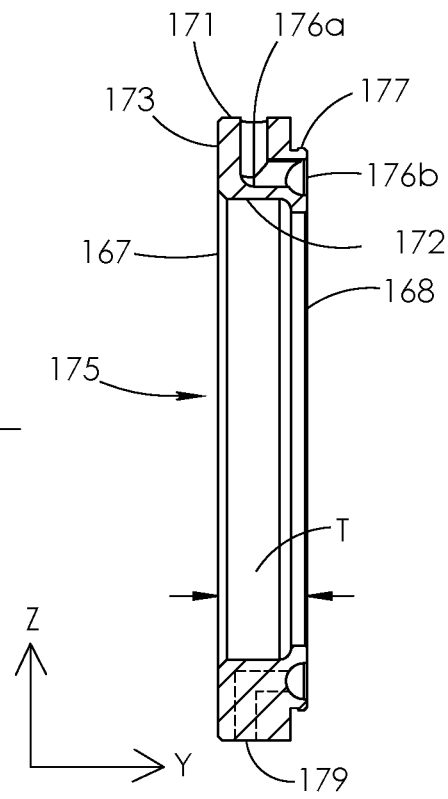

FIGS. 2F and 2G are similar to FIGS. 2C and 2D, respectively, but show the bearing shield 173 detached from, and without, the bearing 10. FIG. 2F shows a front profile view of the bearing shield 173 in the z-x plane with outer face 167 of the greasable seal 173 oriented towards the viewer. FIG. 2G shows a cross-sectional profile view of the bearing shield 173 taken along the section line 2G-2G shown in FIG. 2F. Thus, the shield seal 173 may be releasably coupled to the bearing 10, such as by having the lips 177 snap into the receiving portion 30 of the bearing 10. Additionally, the greasable seal 173 may facilitate and allow for the bearing 10 to have grease added (be greasable) without removing the greasable seal 173 or other shields or seals, such as shields or seals 32, 34, and without exposing the balls 28 or repacking the bearing 10. The greasable seal 173 may facilitate and allow for the bearing 10 to be greaseable and to have grease added the bearing 10 when the bearing 10 is within the carrier bearing assembly 190 (as shown and discussed with respect to FIGS. 3A-3E). Furthermore, lubrication or greasing of the bearing 10 may occur with a snap ring or retaining ring 159 in place, and with the bearing 10, and clamp collars, on the shaft 60 as well. By aligning the slot 176 in the seal 173 with the grease zerk 170 on the housing or bracket 150 and pressing the seal or shield 173 into place, the bearing 10 can conveniently provide for lubrication and improved performance of the bearing 10 without unpacking and repacking the bearing 10 and without a need to remove bearing 10 from the carrier bearing assembly 190, or remove the carrier bearing assembly 190 from a vehicle frame.

Figure 2H:
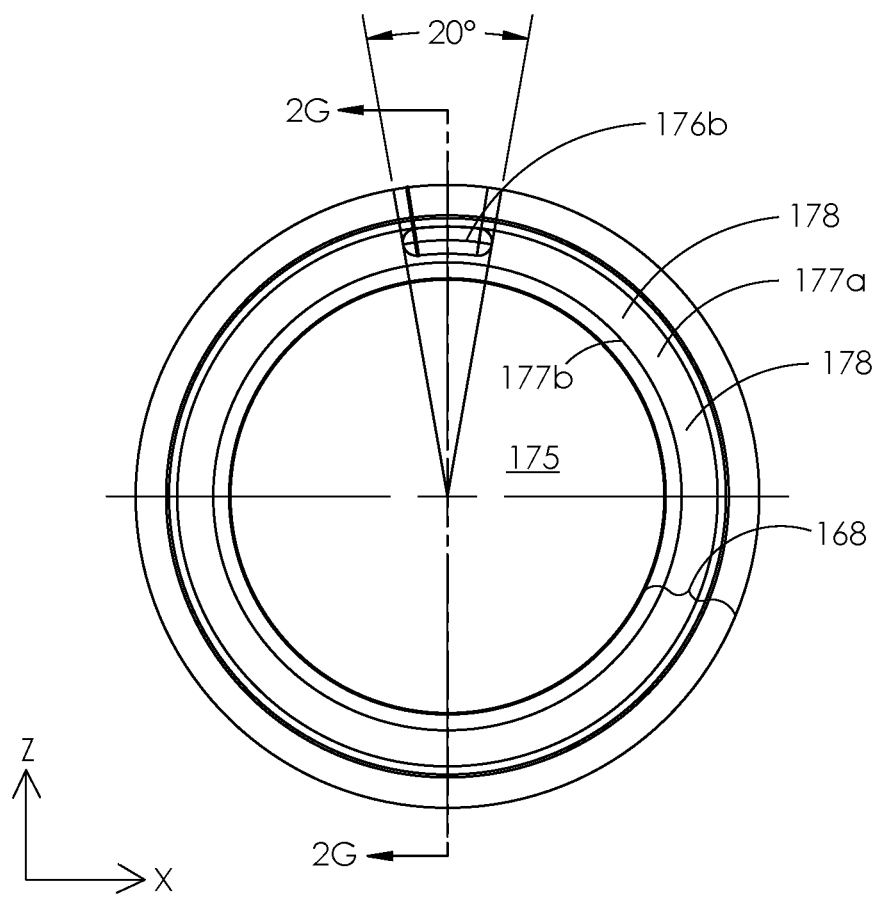

FIG. 2H shows a profile view of the greasable seal 173 in the z-x plane detached or separate from the bearing 10, similar to the view shown in FIG. 2F, but with the view of FIG. 2H showing the inner face 168 of the greasable seal 173 oriented towards the viewer.

Figure 2I:
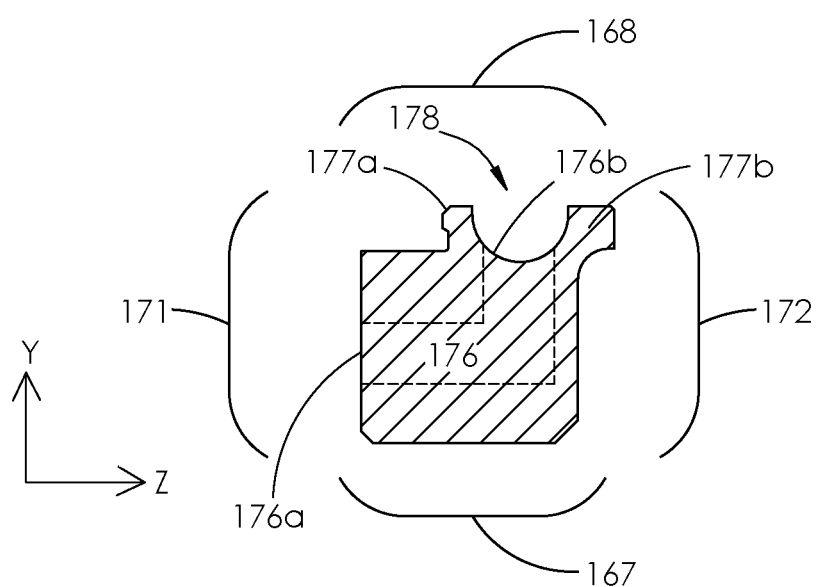

FIG. 2I shows a cross-sectional profile view, in the y-z plane, of a portion of the greasable seal 173 taken along the section line 2I-2I shown in FIG. 2E. FIG. 2I shows the lips 177a and 177b forming or defining the grease channel 178, and what the intake 176 may look like, in cross sectional view, if present in the cross-sectional area shown in FIG. 2I. In some instances, the intake opening 176 may be disposed through the greasable seal 173 and extend from the outer ring-shaped surface 171 to the inner face 168. Alternatively, the intake opening 176 may be disposed through the greasable seal and extend from the outer face 167 to the inner face 168. In some instances, the lip 177 may comprise a first, outer, or upper lip 177a at the inner face 168 that mateably couples adjacent the outer ring 18. The lip 177 may also comprise a second, inner, or lower lip 177b at the inner face 168 that mateably couples adjacent the inner ring 12. In such instances, the lip 177 may be press-fit between the inner ring 12 and the outer ring 18.

FIGS. 3A-3E illustrate various views of an embodiment of the carrier bearing assembly 190. The carrier bearing assembly 190 includes a height H that extends in a vertical or z-direction, a width W that extends in a horizontal, lateral, or x-direction such as generally between left and right sides of the vehicle or in a direction extending between doors of the vehicle, and a length L that is perpendicular to the height and width and extends in a y-direction or along a length of the vehicle, such as between the front and back of the vehicle.

The carrier bearing assembly 190 includes a bracket 150 that can be constructed from a strong, durable, and tough material such as metal, including steel, aluminum, aluminum composite, and other suitable materials. The bracket 150 can be formed of one or more pieces, and in some instances, can be formed of a single, unitary, or modular piece. The bracket 150 can be cast, formed, stamped, machined, carved, or formed in any other suitable way. The bracket 150 can be formed of a single material or multiple materials, including alloys, and with a desired finish, plating, or treatment. The bracket 150 can be coupled, attached, or bolted to the frame 64 of a vehicle or UTV, such as the Polaris RZR 1000, using fastener members 119A and 119B, which can comprise bolts 120 and bolt holes 121 as well as washers 123, bushing pairs 124/125, and bushings 126 as shown in FIG. 3A. When replacing an original carrier bearing assembly, the bolts 120A and 120B can disposed within, or screwed into, the original carrier bearing mounting holes so that the position of the original carrier bearing and the new carrier bearing 190 is the same with respect to the frame 64 of the vehicle and the driveshaft of the vehicle. As shown, the carrier bearing assembly 190 can include a bearing 10, and a driveshaft opening or hole 40 in the bearing 10, through which the driveshaft 60 of the vehicle can pass through.

The fastener members or the mounting structures 119 can be used to couple, secure, or bolt the carrier bearing assembly 190 to the frame 64 and can comprise any desirable mechanical or chemical fasteners including nuts 127 and bolts 120, rods, pegs, clamps, welding, rivets, pins, screws, adhesives, or other suitable devices, such as bolts 120A, 120B, which can be at least one bolt or at least two bolts. In some instances, two bolts 120A and 120B can be used, and the bolts can extend through the bracket 150 from a top side 150c to a bottom side 150d of the bracket 150 (or in some instances from the bottom side to the top side) so as to attach the bracket 150 to corresponding mounting holes 66A, 66B in the frame 64. In other instances, instead of mounting holes 66A, 66B in the frame 64, the frame 64 can comprise one or more bolts, threaded portions, or other structure that extend from the frame 64 into the bolt holes 121A, 121B in the bracket 150. In yet other instances, instead of bolt holes 121A, 121B being formed, or extending into the bracket 150, one or more bolts, threaded portions, or other structure can be integrally formed or permanently attached to the body 150 without using bolt holes 121A, 121B, or without having bolt holes 121A, 121B formed in the body 150, so that the bolts, threaded portions, or other structures extend from the body 150 and can be coupled to the holes 66A and 66B in the frame 60. In some instances, the body 150 may be attached to the mounting holes 66A, 66B with the original bolts 120A, 120B used by an original or OEM carrier bearing, thereby eliminating additional time and expense that could be incurred with the use of other arrangements or fastener members 119, as described above. The bracket 150 can be mounted to the vehicle chassis 64 in a method that allows a small amount of compliance at each fastening location (both bolts 120A, 120B) to account for manufacturing variation in the OEM vehicle frame 64, or different vehicle frames.

The carrier bearing assembly 190 may comprise an auto set angle between the bearing 10 and the bracket 150, or between the bearing 10 within the upper bracket 150A and the lower bracket 150C, or between the bearing 10 and the frame 64, the mounting holes 66, or the shaft 60. For example, FIG. 3A shows an exploded perspective view of the carrier bearing assembly 190, with the front face 151a oriented toward the viewer, and with the upper bracket component 150A disposed above the lower bracket component 150B to be rigidly coupled to the lower bracket 150B, such as with mechanical fasteners or threaded bolts 152, as also shown in FIGS. 3B-3E. The openings through which bolts 152, or bolts 127, pass may be slotted, elongate, curved, or otherwise allow for relative movement and adjustment or automatically setting (auto set) of the bearing 10 and the bracket 150, or between the bearing 10 within the upper bracket 150A and the lower bracket 150C, or between the bearing 10 and the frame 64, the mounting holes 66, or the shaft 60. Overall dimensions of the carrier bearing 190 can be similar or identical to those discussed for similar carrier bearings discussed in the matters to which priority is claimed, and which are incorporated by reference herein.

FIG. 3A also shows the first end 150a and the second 150b of the lower bracket component 150B optionally having different heights, while in other embodiments, the heights of the first end 150a and the second end 150b can be of the same height. In either event, the bracket 150 can comprise busing pairs 124A/124C and 124B/124D that may provide additional compliance between the bracket 150 and the vehicle frame 64 to account for manufacture variation and vibration. The bushings or stepped bushings 124 (including 124A, 124B, 124C, 124D) may be constructed of vibration absorbing material such as rubber. In other instances, the bushings 124A and 124B can be used in isolation, without a corresponding bushing pair such as 124C and 124D, respectively. Similarly, the carrier bearing assembly 190 can also optionally comprise washers 123A and 123B.

An additional and advantageous feature of the greasable seal 173 is that when the seal is coupled to bearings 10 and in operation, including when operating or positioned in out-of-the-way or difficult to access spaces such as disposed within carrier bearing assembly 190, bearing 10 may still be easily greased. Conventionally, bearing 10 would need to be removed from its operating or out-of-the-way space to be greased and be disassembled, such as by removing shields 32 and 34, to have the bearing 10 repacked with grease to ensure proper lubrication to support desired performance and extend the life of the bearing 10 and its parts, such as cage 26 and balls 28. In such instances, repacking the bearing 10 with new grease may involve removing one or more of the shields 32, 34, such as by using a pick or razor knife before adding new grease, removing old grease, or both. Alternatively, an injector needle may be used to inject grease without removing the covers or shields 32, 34. However, in either event, the process of adding grease to extend the life and improve the functionality of the bearing 10 can damage the one or more shields 32, 34, and at a minimum, require additional time and labor to access and grease the bearing.

On the other hand, with greasable seal 173 coupled to the bearing 10, the bearing 10 can be greased by supplying grease through the zerk, grease fitting, or grease nipple 170, which will allow the grease to pass from the zerk 170, through the intake opening 176, and extend into the bearing 10 and around the cage 26 and balls 28, using, e.g., a grease gun. As such, the bearing 10 with the greasable seal 173 may be greased while in use, such that the bearing need not be removed or disassembled to be greased. In so doing, the greasable seal 173 and the intake opening 176 may comprise and alignment that may remained fixed with respect to the zerk 170 and without rotating while the inner ring 12 is free to move with the shaft 60 disposed within the opening 40.

Undesired grease, debris, and fluids, such as water, may be prevented from entering and exiting through the opening 176 by a ball and spring within the zerk 170, or by the bearing 10 being filled with a sufficient volume of grease or lubricant or sufficient viscosity. When the second opening or outflow 179 is present in the greasable seal 173, undesired debris or fluid may similarly be prevented from entering or exiting the outflow 179 with a sufficient volume of grease or lubricant or sufficient viscosity. As such, greasing and operation of the bearing 10, including within or without the carrier bearing assembly 190 can be facilitated by greasable seals 173.

Figure 3B:
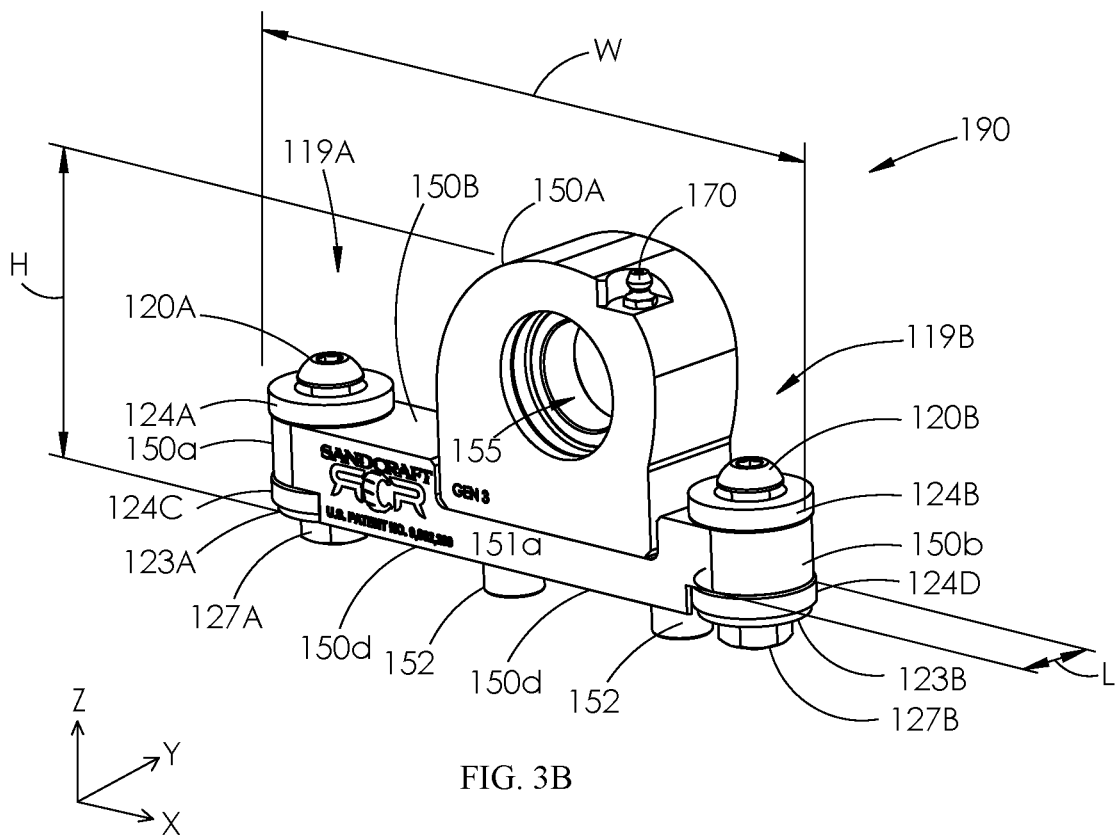

FIG. 3B shows an example of a non-exploded view of the carrier bearing assembly 190, similar to the view of the carrier bearing 190 shown in FIG. 3A. FIG. 3B shows greasable seal 173 disposed against or adjacent a side of bearing 10 when the bearing 10 and the bearing shield 174 opposite the greasable seal 173 are disposed within the opening 155 in the bracket 150. The bearing shield 174 can be made of metal, rubber, or other suitable material, and can keep trash, foreign debris, and undesired materials from contacting, contaminating, or harming the bearing 10, but without the added functionality of greasable seal 173, that allows for greasing or adding lubricant to the bearing 10 while the greasable seal 173 is mateably coupled to the bearing 10.

Figure 3C:
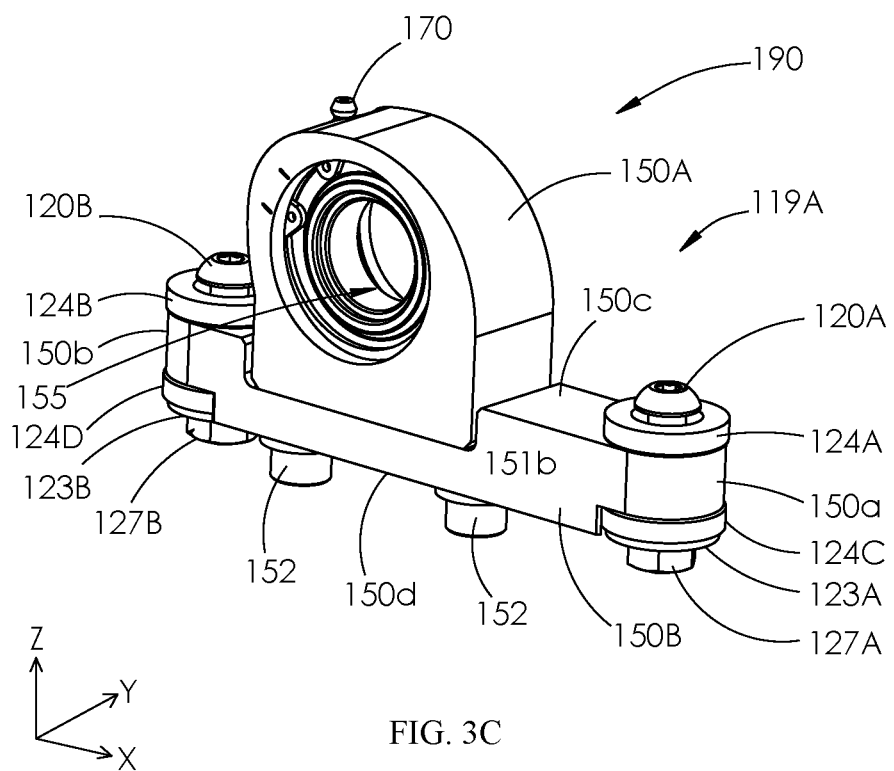

FIG. 3C shows an example of a non-exploded view of the carrier bearing assembly 190, similar to the view of the carrier bearing 190 shown in FIG. 3B, but with the back 151b of the bracket 150 or the carrier bearing assembly 190 oriented towards the viewer instead of the front 151a oriented towards the viewer.

FIG. 3D shows a rear profile view of the carrier bearing assembly 190 similar to the perspective view of FIG. 3C. In FIG. 3D, the curvature of sides of the upper integrally formed or machined bracket component 150A are shown, in which the sides of the upper component 150A are vertical. While FIG. 3D shows the zerk 170 disposed towards the second end 150b of the bracket 150, the zerk 170 can also be disposed toward the first end 150 of the bracket 150. Similarly, the zerk 170 may be disposed at any desirable location along the bracket 150, whether towards the first end 150a or the second end 150b.

FIG. 3E shows a sectional view of the carrier-bearing 190 taken along the section-line 3E-3E shown in FIG. 3D. FIG. 3E also includes a portion of a drive shaft 60 disposed in the opening 155 of the carrier-bearing 190.

Figure 4:
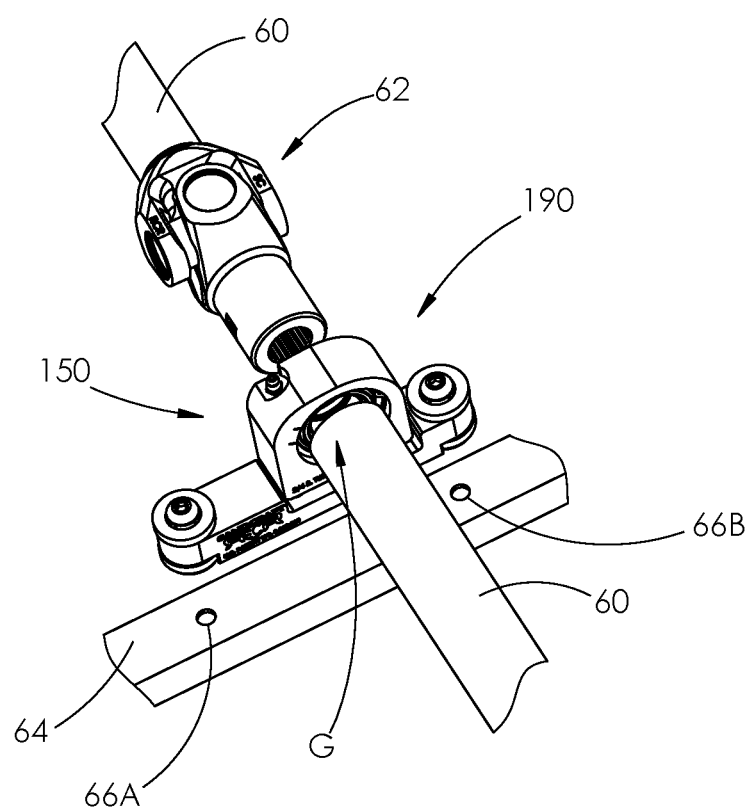
FIG. 4 illustrates a carrier bearing assembly coupled to a drive shaft.

FIG. 4 shows a carrier bearing assembly, such as carrier bearing assembly 190, that is situated on the drive shaft 60, which may include one or more u-joints 62. The carrier bearing assembly 190 can then be fastened or bolted to the frame 64 of the UTV, with the openings or bolt holes 121A, 121B aligned with the openings 66A, 66B in the frame 64. In some instances, the alignment of the openings or bolt holes 121A, 121B will be directly aligned with the openings 66A, 66B without an intermediary member or adapter. In yet other instances, one or more intervening members or adapters may be used to adapt or align the openings or bolt holes 121A, 121B with the openings 66A, 66B. In yet other instances, the openings or bolt holes 121A, 121B can be aligned with new or custom openings formed in the frame 64, rather than relying on one or more of the original openings 66A, 66B in the frame 64.

Where the above examples, embodiments and implementations reference examples, it should be understood by those of ordinary skill in the art that other manufacturing devices and examples could be intermixed or substituted with those provided. Accordingly, for example, although particular features may be disclosed, such components may comprise any shape, size, style, type, model, version, class, grade, measurement, concentration, material, weight, quantity, and/or the like consistent with the intended operation of a method and/or system implementation may be used. In places where the description above refers to particular implementations, it should be readily apparent that a number of modifications may be made without departing from the spirit thereof and that these implementations may be applied to other embodiments. Accordingly, the disclosed subject matter is intended to embrace all such alterations, modifications and variations that fall within the spirit and scope of the disclosure and the knowledge of one of ordinary skill in the art.

What is claimed is:

1. A greasable ball bearing assembly, comprising:
   an outer ring;
   an inner ring disposed within, and concentric with, the outer ring;
   a separator comprising a plurality of openings disposed between the outer ring and the inner ring;
   a plurality of balls disposed within the plurality of openings;
   a seal disposed at a first side of the outer ring and the inner ring and coupled between the outer ring and the inner ring to cover the separator and the plurality of balls; and
   a greasable seal disposed opposite the seal at the first side, the greasable seal further comprising:
      a toroidal shape comprising an axial facing outer face and an axial facing inner face,
      a radial facing outer ring-shaped surface that extends from the outer face to the inner face,
      a radial facing inner ring-shaped surface that extends from the outer face to the inner face,
      an intake opening disposed through the greasable seal that extends from the outer ring-shaped surface to the inner face, and
      a securing member formed as a lip at the inner face to mateably couple between the inner ring and the outer ring.

2. The carrier bearing assembly of claim 1, wherein the greasable seal is formed of a polymer, a plastic, Polytetrafluoroethylene (PTFE), or brass.

3. The carrier bearing assembly of claim 1, wherein the intake opening of the greasable seal is in communication with a zerk.

4. The carrier bearing assembly of claim 1, wherein the greasable seal comprises a thickness (Ts) that is measured in a direction perpendicular to a radial direction (r) of the greasable seal, the thickness Ts being in a range of 0.5-1.1 times a thickness Tr of the outer ring.

5. The carrier bearing assembly of claim 1, wherein an outflow opening is formed in the greasable seal opposite the intake opening to allow excess grease to exit the greasable seal.

6. The carrier bearing assembly of claim 5, wherein the outflow opening is smaller than the intake opening.

7. The carrier bearing assembly of claim 1, wherein the lip at the inner face of the greasable seal is press-fit between the inner ring and the outer ring.

8. A greasable seal for a greasable ball bearing assembly, comprising:
   a toroidal shape comprising an axial facing outer face and an axial facing inner face;
   a radial facing outer ring-shaped surface that extends from the outer face to the inner face;
   a radial facing inner ring-shaped surface that extends from the outer face to the inner face;
   an intake opening disposed through the greasable seal that extends from the outer ring-shaped surface to the inner face; and
   a securing member formed as a lip at the inner face to mateably couple between an inner ring and an outer ring of a ball bearing.

9. The carrier bearing assembly of claim 8, wherein the greasable seal is formed of Polytetrafluoroethylene (PTFE).

10. The carrier bearing assembly of claim 8, wherein the intake opening of the greasable seal is in communication with a zerk.

11. The carrier bearing assembly of claim 8, wherein the greasable seal comprises a thickness (Ts) that is measured in a direction perpendicular to a radial direction (r) of the greasable seal, the thickness Ts being in a range of 0.5-1.1 times a thickness Tr of an outer ring or a bearing to which the greasable seal is configured to be coupled.

12. The carrier bearing assembly of claim 8, wherein an outflow opening is formed in the greasable seal opposite the intake opening to allow excess grease to exit the greasable seal.

13. The carrier bearing assembly of claim 12, wherein the outflow opening is smaller than the intake opening.

14. The carrier bearing assembly of claim 8, wherein the lip at the inner face of the greasable seal is configured to be press-fit between an inner ring and an outer ring of a bearing.

15. A greasable seal for a greasable ball bearing assembly, comprising:
- a toroidal shape comprising an axial facing outer face and an axial facing inner face;
- a radial facing outer ring-shaped surface that extends from the outer face to the inner face;
- a radial facing inner ring-shaped surface that extends from the outer face to the inner face;
- an intake opening disposed through the greasable seal that extends to the inner face; and
- a securing member formed on the inner face to mateably couple with a ball bearing, wherein the securing member further comprises a lip formed on the inner face to mateably couple between an inner ring and an outer ring of a ball bearing.

16. The carrier bearing assembly of claim 15, wherein the intake opening disposed through the greasable seal extends from the outer ring-shaped surface to the inner face.

17. The carrier bearing assembly of claim 15, wherein the greasable seal is formed of Polytetrafluoroethylene (PTFE).

18. The carrier bearing assembly of claim 15, wherein the intake opening of the greasable seal is in communication with a zerk.

19. A greasable seal for a greasable ball bearing assembly, comprising:
- a toroidal shape comprising an axial facing outer face and an axial facing inner face;
- a radial facing outer ring-shaped surface that extends from the outer face to the inner face;
- a radial facing inner ring-shaped surface that extends from the outer face to the inner face;
- an intake opening disposed through the greasable seal that extends to the inner face; and
- a securing member formed on the inner face to mateably couple with a ball bearing, wherein an outflow opening is formed in the greasable seal opposite the intake opening to allow excess grease to exit the greasable seal.

\* \* \* \* \*